United States Patent [19]

Chandler, Jr. et al.

[11] Patent Number: 5,482,315
[45] Date of Patent: Jan. 9, 1996

[54] LARGE L/D RATIO TUBULAR HYBRID GAS GENERATOR FOR THE INFLATION OF AIR BAGS

[75] Inventors: William A. Chandler, Jr., Murr, Germany; Leland B. Kort, Lakewood, Colo.; Randall J. Clark, Pleasant View, Utah

[73] Assignee: Morton International, Inc., Chicago, Ill.

[21] Appl. No.: 255,147

[22] Filed: Jun. 7, 1994

[51] Int. Cl.$^6$ .................................................. B60R 21/26
[52] U.S. Cl. .................. 280/741; 280/730.1; 280/730.2; 280/731; 280/736
[58] Field of Search ..................... 280/741, 731, 280/730 R, 730 A, 736

[56] References Cited

U.S. PATENT DOCUMENTS

| | | | |
|---|---|---|---|
| 3,680,884 | 8/1972 | Stephenson | 280/150 |
| 3,744,817 | 7/1973 | Ousset | 280/731 |
| 3,822,894 | 7/1974 | Muller et al. | 280/731 |
| 4,101,146 | 7/1978 | Oehm | 280/731 |
| 4,275,901 | 6/1981 | Okada | 280/741 |
| 4,796,912 | 1/1989 | Lauritzen et al. | 280/736 |
| 5,066,038 | 11/1991 | Frantom et al. | 280/731 |
| 5,094,475 | 3/1992 | Olsson et al. | 280/736 |
| 5,131,680 | 7/1992 | Coultas et al. | 280/737 |
| 5,190,313 | 3/1993 | Hickling | 280/731 |
| 5,242,194 | 9/1993 | Popek | 280/737 |
| 5,290,059 | 3/1994 | Smith et al. | 280/741 |
| 5,342,089 | 8/1994 | Fink et al. | 280/731 |

FOREIGN PATENT DOCUMENTS 4209944  5/1993  Germany .......................... 280/730 A

*Primary Examiner*—Eric D. Culbreth
*Attorney, Agent, or Firm*—Lawrence I. Field; Nick C. Kottis; Gerald K. White

[57] ABSTRACT

An elongated tubular hybrid gas generator for the inflation of air bags in which the ratio of length to diameter is at least ten. The device may be substituted for a structural element in a motor vehicle, e.g. a steering column or a beam in a door panel with consequent savings in weight and size.

5 Claims, 2 Drawing Sheets

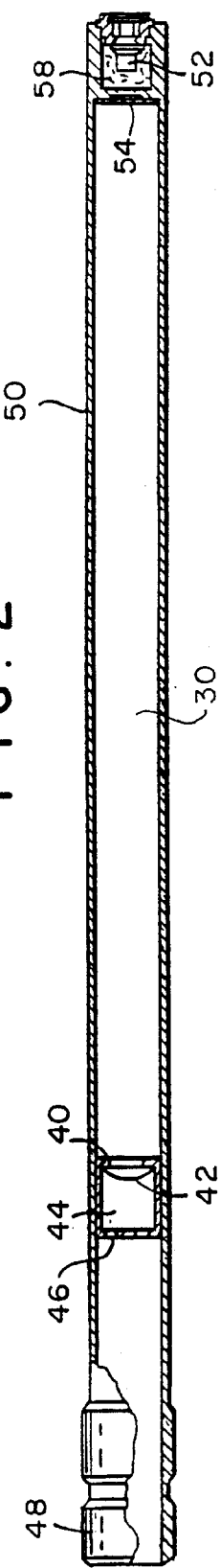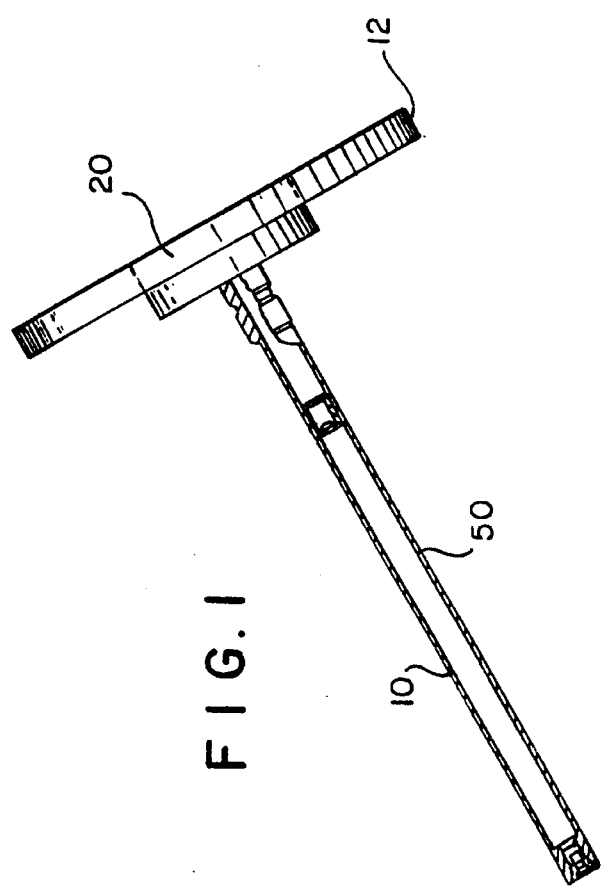

LARGE L/D RATIO TUBULAR HYBRID GAS GENERATOR FOR THE INFLATION OF AIR BAGS

This invention is a hybrid gas generator with an elongated tubular configuration which includes a chamber for storing inert gas under high pressure, a diffuser chamber and a chamber containing a pyrotechnic heater and initiator. This "long" inflator has definite advantages and can be placed where conventional inflators are too big and bulky. For example the inflator can be dimensioned so as to replace the presently known solid steering column in a motor vehicle or a structural member in a door panel or in a seat back in said vehicle. By use of inflation devices produced according to the present invention it is possible to place an air bag in a wide variety of useful locations in which it is effective and with minimal weight increase to the vehicle whose occupants are being protected.

The devices of this invention are characterized by an unusually large L/D ratio, greater than 10 and preferably at least 12.5. A typical diameter contemplated is 1.25 inches with a length of at least 12 inches.

BACKGROUND OF THE INVENTION

Automobile safety in recent years has been improved by the installation of a variety of passenger restraints including seat belts, shoulder harnesses, and air bags. Air bags are inflated automatically at the instant of a crash or other impacts, and have been designed to be inflated in one of three modes. Air bags may be inflated by a gas such as argon or nitrogen stored under high pressures in suitable containers; or by gases generated by the ignition of pyrotechnic or explosive compositions; or by a combination of both, in what are presently called hybrid gas generators. Hybrid gas generators make it weight, volume, and pressure of the typical gas cylinder used in prior art a In present day motor vehicles air bag inflators are usually provided for and are optionally provided for passengers. These devices are installed as accesso such they add to the weight of the vehicle.

Among the locations which have been suggested are mounting the inflator on the ceiling or seat of a vehicle (Martin U.S. Pat. No. 3,606,377). Still other suggestions include fabricating a inflator as a bumper (Amit U.S. Pat. 3,708,194) or as the rim of a steering wheel (German Offen DE 31 26 079 A1), or as an accessory mounted on a steering column (Okada U.S. Pat. No. 4,275,901). In the present invention the inflator may replace a structural element of the vehicle with consequent savings in material and in weight.

OBJECTS OF THE INVENTION

One object of the present invention is to provide a hybrid gas generator in which the pressurized gas is stored in a cylinder with an unusually large length to diameter (L/D) ratio and in which the overall dimensions of the device have an L/D ratio greater than about 10.

Another object of the invention is to provide a hybrid gas generator in which the stored pressurized gas receptacle may be installed as the steering column of a vehicle.

A further object of the invention is to provide an inflator which can serve as a structural component of the vehicle in which it is installed, or as a structural reinforcement for such a component.

These and other objects will be pointed out or will become apparent from the description which follows taken in conjunction with the drawings in which:

FIG. 1 is a schematic view of a driver side inflator installed as the steering column of a vehicle;

FIG. 2 is a more detailed view of the inflator;

Figure 3:
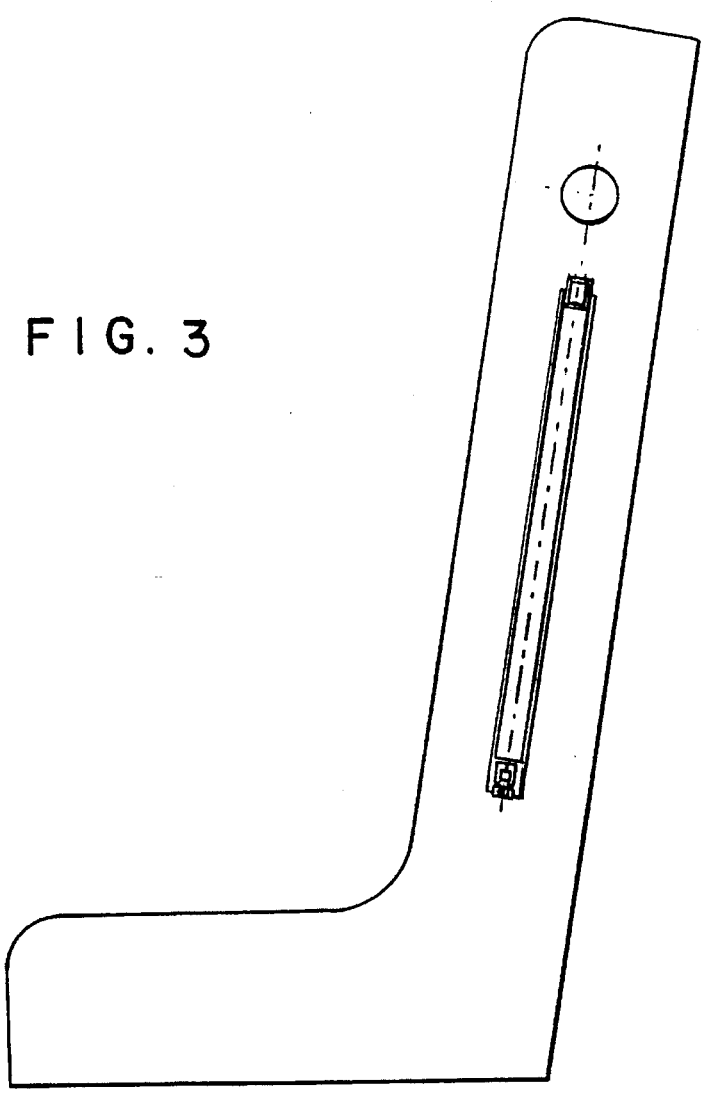
FIG. 3 is a schematic view of the inflator installed for another use in the vehicle, e.g. on a seat member.

As shown in the drawings, the invention is a hybrid (augmented) stored gas inflator 10 for air bag restraint systems. The inflator 10 comprises an elongated slender tubular shaped cylinder 50 for storing inert gas such as argon or nitrogen under high pressure, for example at 2000 to 4000 psi. The inflator also has a pyrotechnic heat source 52 which utilizes boron potassium nitrate or other known pyrotechnic compositions to heat the stored gas. The inflator includes a thin metal diaphragm 42 to provide a pressure seal between a storage chamber 30 and a diffuser chamber 44 which is at atmospheric pressure and which contains gas orifices 46 for dispensing gas uniformly into the air bag assembly (not shown). The gas storage chamber 30 is further sealed from the pyrotechnic combustion chamber (igniter chamber), by a thin metal diaphragm 54 welded to cylinder 50 around the perimeter to withstand the loads of the high pressure gas being stored. A plug 66 seats in a chamfered hole 64 covering a nozzle orifice 68 at the exhaust end of the combustion chamber thereby providing support for the thin diaphragm across its entire surface. The chamfered hole assures that the plug does not rattle during vibration of the inflator or module assembly. The igniter port plug could be replaced by a reverse buckling burst disk or similar means without departing from the present invention.

The inflator shown as FIGS. 1 and 2 includes an elongated high pressure gas cylinder 50 dimensioned to serve as a structural element in a vehicle. A preferred intended use is as a steering column in place of present day solid columns.

A conventional steering wheel 10 consists of a rim 12 or hub and spokes which define a well in which a shell 20 containing a folded air bag is adapted to be disposed.

Cylinder 50 is preferably cylindrical, but it could be polygonal or oval in cross section. Cylinder 50 has a length to diameter ratio of at least 10 and preferably at least 12.5. One cylinder installed as a steering column was made of a low carbon steel and had a length of fourteen inches and a diameter of one inch. Cylinder 50 has the usual filling opening for charging it with gas under pressure (not shown) and means to close the filling opening. Positioned at one end of chamber 50, are a pyrotechnic charge 58 and igniter 52.

Positioned at the opposite end of cylinder 50 are a controlling orifice plate 40, a metal diaphragm 42 and a diffuser chamber 44. Diffuser chamber 44 is closed at its entry end by diaphragm 42 and has a screen 46 at its discharge end.

Coarse screen 46 or a perforated metal sheet is included inside the diffuser to prevent hot particles from entering the air bag cushion. Further filtering of the hot particles is accomplished by a filter assembly (not shown) which may be in the steering column or in the steering wheel 12. A suitable interface 48 is provided for connection between the cylinder 50 and a steering wheel 12.

Figure 4:
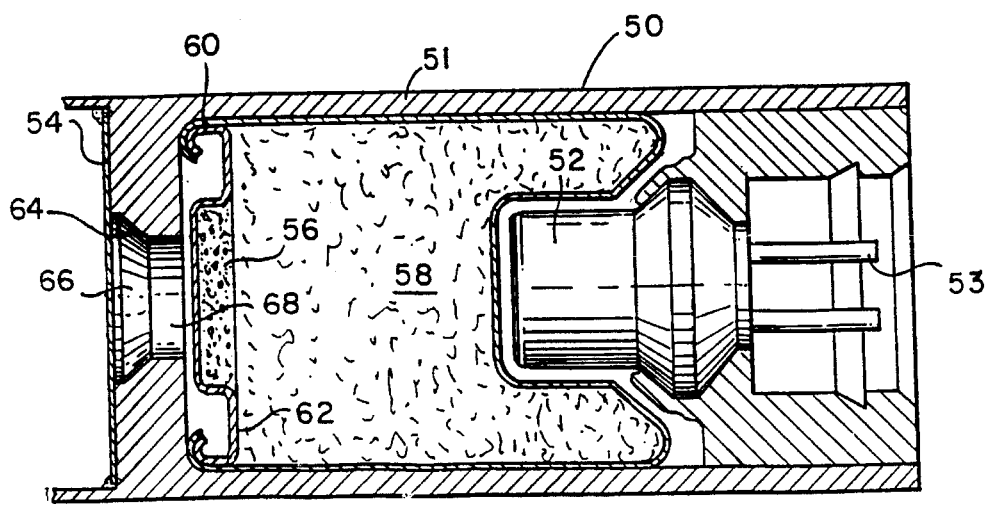
FIG. 4 is a view of the pyrotechnic portion of the inflation system of this invention.

The pyrotechnic portion of the inflation system is shown in greater detail in FIG. 4. As seen in the Figure, it consists of a metal can 51 formed by an extension of cylinder 50. An initiator assembly 52 is mounted at one end of can 51. Electrical contact pins 53 extend out of the initiator 52 and are connected to a source of electricity (not shown) which fires the initiator when a crash occurs.

An auto ignition charge 56 and a pyrotechnic charge 58 are enclosed in a cup shaped metal cup 60. The bottom closed end of cup 60 is recessed to receive initiator 52. The top open end of cup 60 is closed by a cap 62 which is crimped to the walls of cup 60. A diaphragm 54 is welded to the walls of cylinder 50 to close the pyrotechnic assembly. Between the diaphragm 54 and cover 62 are a plug 66, seated in a chamfered hole 64 and a nozzle plate 68. Cap 62 includes an offset portion which receives a wafer 56 of auto ignition material. A more complete description of the device of FIG. 4 may be found in U.S. Pat. No. 5,290,060 issued Mar. 1, 1994 the disclosure of which is incorporated herein.

The hybrid inflator functions as follows: In response to a signal indicative of a vehicle crash, a control signal is communicated to the initiator 52 which is activated. Upon activation, the initiator fires, igniting the pyrotechnic charge 58. Pressure within the cup shaped pyrotechnic combustion chamber 60 (igniter chamber) rises until it exceeds the gas storage chamber pressure, whereupon the plug 66 is unseated. Subsequently the thin diaphragm 54 ruptures when the combustion pressure exceeds the gas storage pressure and the strength of the thin metal disk. Hot gas and hot particles from the burning pyrotechnic heat the stored gas, causing a rapid pressure rise in the storage chamber 30. When the pressure inside the storage chamber exceeds the structural capacity of the thin metal disk 42 between the diffuser chamber and the storage chamber the disk ruptures and allows the heated gas to vent through the orifices in diffuser 44 into the air bag assembly to inflate the air bag. The gas flow out of the chamber into the diffuser is controlled by an orifice plate 40. This orifice plate consists of a thin metal ring or disk with an accurately sized hole in the middle. This orifice throttles the flow of gas from the storage chamber and provides the proper fill rate into the air bag.

Instead of serving as the steering column, the elongated tubular inflator may be substituted for some other structural element such as a beam in a door panel or a frame member for a seat back e.g. as shown in FIG. 3, where it may function to protect from side impacts. The inflator 10 need not replace a structural element but may instead be installed in the same manner as prior art inflators, as an accessory mounted on the dashboard, steering wheel, car door, seat back, or other location on a vehicle.

It is also possible to dimension the elongated inflation and storage gas cylinder so that it fits snugly into a tubular structural member such as a strut in a seat back or a door panel, which it then reinforces.

The inflator 10 is provided with appropriate extensions at one end to receive the pyrotechnic assembly and at the other end to connect it to the air bag to be inflated.

Having now described a preferred embodiment of the invention it is not intended that it be limited except as required by the appended claims.

We claim:

1. An inflator dimensioned to serve as a structural element in a vehicle comprising:

an elongated hollow cylinder having an inner wall within which there are disposed the following components:

a first diaphragm welded to the inner wall of said cylinder spaced from one end of said cylinder, so as to define a cup shaped cavity at said end of said cylinder, a pyrotechnic charge and an igniter positioned in said cavity, a second diaphragm secured to the inner walls of said cylinder near the other end of said cylinder, a screen at said other end of said cylinder so as to define a diffuser chamber in said cylinder, a storage chamber in said elongated cylinder consisting of the volume between said diaphragms for storing a gas under pressure, all of said components being contained inside said elongated hollow cylinder.

2. The inflation system according to Claim 1 wherein the tubular structure has a length to diameter ratio greater than about 10.

3. The inflation system according to Claim 1, installed as a structural element in a vehicle.

4. A steering column for a vehicle comprising the inflator of Claim 1.

5. The inflation system according to Claim 1 installed within a hollow steering column in a vehicle.

* * * * *

UNITED STATES PATENT AND TRADEMARK OFFICE
CERTIFICATE OF CORRECTION

PATENT NO. : 5,482,315
DATED : 9 January 1996
INVENTOR(S) : William A. Chandler, Jr. et al.

It is certified that error appears in the above-indentified patent and that said Letters Patent is hereby corrected as shown below:

At column 1, line 37, "prior art a" should be
  --prior art air bag inflators.--.

At column 1, line 39, first occurrence, "provided for and" should be
  --provided for the driver and--.

At column 1, line 39, second occurrence, "provided for passengers" should be --provided for the passengers.--.

At column 1, line 40, "accesso such" should be
  --accessories. As such--.

Signed and Sealed this

Twenty-third Day of July, 1996

BRUCE LEHMAN

*Attest:*

*Attesting Officer*        Commissioner of Patents and Trademarks